A. L. MEEKS.
AUTOMOBILE TIRE.
APPLICATION FILED FEB. 17, 1920.

1,352,375. Patented Sept. 7, 1920.

Inventor
Annie L. Meeks

By Beall & Fenwick
Attorneys

UNITED STATES PATENT OFFICE.

ANNIE L. MEEKS, OF GADSDEN, ALABAMA.

AUTOMOBILE-TIRE.

1,352,375.	Specification of Letters Patent.	Patented Sept. 7, 1920.

Application filed February 17, 1920. Serial No. 359,440.

*To all whom it may concern:*

Be it known that I, ANNIE L. MEEKS, a citizen of the United States, residing at Gadsden, in the county of Etowah and State of Alabama, have invented certain new and useful Improvements in Automobile-Tires; and I do hereby declare the following to be a full, clear, and exact description of the invention, such as will enable others skilled in the art to which it appertains to make and use the same.

This invention relates to built up pneumatic tires or tire shoes.

An object of this invention is to provide an improved built up tire construction and to provide a tire of resilience, in the nature of a synthetic tire, and to reduce the friction of contacting surfaces in tires and in layers forming a built up tire, and also to provide a bed for corded parts of layers of said built up tire, and also to provide an armored tire of synthetic structure.

With these and other objects in view the invention consists in the construction, the combination, the detail, and arrangement of parts as hereinafter more fully described and claimed.

Figure 1:
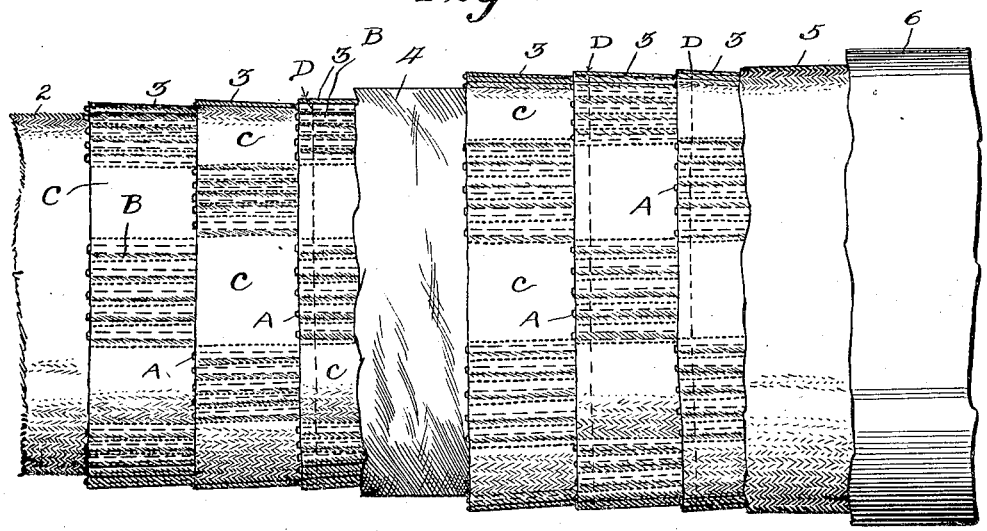
Figure 1 shows a part of a tire partly broken away showing the layers.

In the embodiment of my invention there is provided an inner fabric 2, a series of layers of corded osnaburg 3, an intermediate armor of rawhide 4, an outer layer of fabric 5 and a tread layer 6. The layers of osnaburg are made in short strips and lapped as better shown in Fig. 3. Each layer of osnaburg is provided with groups of longitudinally extending cords A, between which are stitches B, with an intervening space C between the sets of cords. These layers may be advantageously made of two thicknesses of osnaburg or other suitable material, with the cords interposed and all stitched together between the cords as illustrated. The layers of osnaburg are also transversely stitched as at D. The alternate cording and spaces C are of substantially equal width, so that when the respective layers of osnaburg are placed one upon the other the said spaces C on one of said layers form a seat or bed for the corded section on the other said layer so that the two layers when together are of substantially the same thickness as would be a single layer of cords filling the whole of the osnaburg, at the same time improving the vulcanizing area and providing for resiliency and against chafing, and by reason of the short individual sections of fabric forming the tire structure providing for a tire which can be repaired and made practically new.

Figure 2:
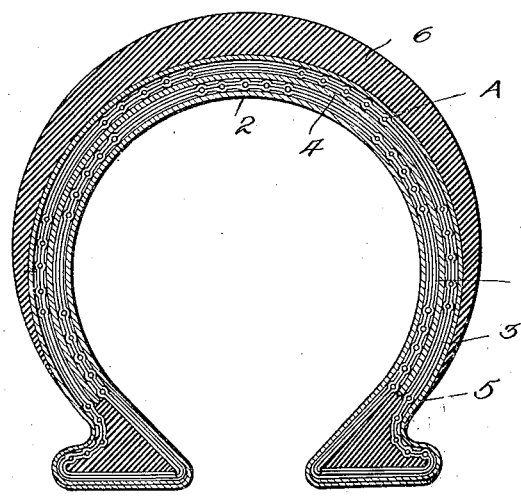
Fig. 2 is a cross section through my improved tire.
Figure 3:
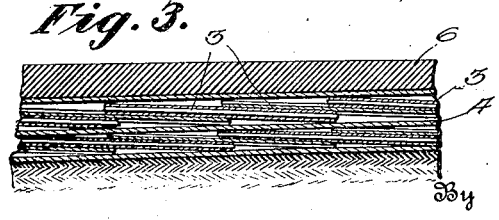
Fig. 3 is a fragmentary longitudinal section.

In Fig. 2 the alternating layers of osnaburg are omitted for clearness in illustrating the manner of the laying of the cords in the layer, there being there shown between the rawhide armor and the interior fabric only one layer of osnaburg and likewise also between the rawhide armor and the exterior fabric only one layer of osnaburg, which however, as shown in Fig. 3 and Fig. 1, are multiplied. While I have illustrated the rawhide armor as extending clear around the tire, yet in practice I prefer to use it for only about a quarter of the circle below the heaviest portion of the tread. I am aware of the fact that leather has been used in built up tires, but I have found the rawhide superior to any cured product.

What I claim is:

1. In a tire, a reinforcement layer comprising a plurality of fabric sections arranged transversely of the tire and so that each overlaps the one next adjacent and is secured thereto, each of said sections having a plurality of spaced groups of cords secured thereto, said cords extending circumferentially of the tire.

2. In a tire, a reinforcement layer comprising a plurality of fabric sections arranged transversely of the tire and so that each overlaps the one next adjacent and is secured thereto, each of said fabric sections comprising two thicknesses of the fabric and having a plurality of spaced groups of cords secured therebetween.

3. In a tire, a reinforcement layer comprising a plurality of fabric sections arranged transversely of the tire and so that each overlaps the one next adjacent and is secured thereto, each of said fabric sections being provided with a plurality of spaced groups of cords secured thereto, the cord groups of one section being arranged in staggered relation to those of the next adjacent and overlapped section, so as to seat in the spaces between the cord groups of the latter.

4. In a tire, the combination of a plurality of reinforcement layers comprising a plurality of fabric sections arranged transversely of the tire and so that each overlaps the one next adjacent and is secured thereto, each of said fabric sections comprising two thicknesses of the fabric and having a plurality of spaced groups of cords secured therebetween with an intermediate layer of an armor material, such as rawhide.

5. In a tire, the combination of a plurality of reinforcement layers, each comprising a plurality of fabric sections arranged transversely of the tire and so that each overlaps the one next adjacent and is secured thereto and each provided with a plurality of spaced groups of cords, the cord groups of one section being arranged in staggered relation to those of the next adjacent and overlapped section so as to seat in the spaces between the cord groups of the latter and an intermediate layer of an armor material, such as rawhide.

6. In a tire structure comprising a plain fabric layer, a plurality of reinforcement layers each comprising a plurality of fabric sections arranged transversely of the tire and so that each overlaps the one next adjacent and is secured thereto, each of said fabric sections being provided with a plurality of spaced groups of cords, the cord groups of one section being arranged in staggered relation to those of the next adjacent and overlapped section so as to seat in spaces between the cord groups of the latter and an intermediate layer of an armor material, such as rawhide, all superposed on said first fabric section, a fabric section superposed upon said reinforcement layers and a tread surrounding the whole substantially as specified.

In testimony whereof I affix my signature in presence of two witnesses.

ANNIE L. MEEKS.

Witnesses:
  H. B. MYERS,
  A. F. HEATH.